United States Patent [19]

Burns

[11] Patent Number: 5,579,600
[45] Date of Patent: Dec. 3, 1996

[54] FISH HOOK AND METHOD FOR ATTACHMENT TO A LINE OR LURE

[76] Inventor: Jesse Burns, P.O. Box 28218, Las Vegas, Nev. 89126

[21] Appl. No.: 541,035

[22] Filed: Oct. 11, 1995

[51] Int. Cl.⁶ .................................................. A01K 91/04
[52] U.S. Cl. ........................................ 43/44.83; 43/43.16
[58] Field of Search ........................... 43/43.16, 44.82, 43/44.83, 44.81

[56] References Cited

U.S. PATENT DOCUMENTS

| | | |
|---|---|---|
| 77,365 | 4/1868 | Fish . |
| 86,154 | 1/1869 | Hiltz . |
| 103,645 | 5/1870 | Muscroft . |
| 196,648 | 10/1877 | Edgar . |
| 310,118 | 12/1884 | Bower . |
| 648,552 | 5/1900 | Crane . |
| 683,750 | 10/1901 | Guindon . |
| 699,397 | 5/1902 | Lacey . |
| 749,852 | 1/1904 | Dunn . |
| 779,843 | 1/1905 | Fredricks . |
| 788,201 | 4/1905 | Friend . |
| 895,493 | 8/1908 | O'Brien . |
| 1,313,372 | 8/1919 | Dodge ........................... 43/44.83 |
| 1,334,839 | 3/1920 | Cole . |
| 1,471,959 | 10/1923 | Halferty . |
| 1,717,190 | 6/1929 | Coleman . |
| 2,060,499 | 11/1936 | Heidrich . |
| 2,138,702 | 11/1938 | Litsey . |
| 2,315,307 | 11/1943 | Wilson . |
| 2,523,833 | 9/1950 | Lando . |
| 2,570,468 | 10/1951 | Matthes . |
| 2,590,558 | 3/1952 | Mickelson . |
| 2,592,664 | 4/1952 | Mello . |
| 2,621,438 | 12/1952 | Helin . |
| 2,651,133 | 9/1953 | Sharps . |
| 2,700,242 | 1/1955 | Porth . |
| 2,749,652 | 6/1956 | Slane . |
| 2,751,652 | 6/1956 | Leibow . |
| 2,792,664 | 5/1957 | Schwarzer . |
| 2,808,678 | 10/1957 | Leonardi . |
| 2,843,964 | 7/1958 | Smith . |
| 2,847,220 | 8/1958 | Heffron et al. . |
| 2,861,383 | 11/1958 | Gray . |
| 2,938,296 | 5/1960 | Kracht . |
| 2,979,852 | 4/1961 | Schinke et al. . |
| 3,013,357 | 12/1961 | Bujjoni . |
| 3,541,720 | 11/1970 | Buffet . |
| 3,724,116 | 4/1973 | Lindner et al. . |
| 3,848,354 | 11/1974 | Austad et al. . |

(List continued on next page.)

FOREIGN PATENT DOCUMENTS

| | | | |
|---|---|---|---|
| 0490356 | 2/1953 | Canada ................................. | 43/44.8 |
| 0121921 | 4/1971 | Norway ............................... | 43/43.16 |

*Primary Examiner*—Joseph J. Hail, III
*Assistant Examiner*—James Miner
*Attorney, Agent, or Firm*—M. Reid Russell

[57] ABSTRACT

A fish hook formed to have a straight shank portion with a lower shank end formed into a curve and ends in a point that is barbed or barbless, and having an upper shank end that includes a pair of separate parallel loops that are each open at their ends and have flat opposing faces juxtapositioned to one another with each face including a lateral slot or groove, formed thereacross, the slots or grooves to align to form a hole or passage therethrough. The invention also includes procedures for quickly attaching or mounting the fish hook onto a fishing line end or lure so as to be easily detached therefrom that includes, passing an end section or sections of a fishing line, that has had a knot formed in its end, past one of the fish hook open loop open ends, and urging the fishing line between the loops opposing flat faces to the hole or passage formed across the opposing faces and drawing the fishing line through the hole or passage for a single loop tie; and, for a compound loop tie, additionally looping the fishing line around the hook open loops by pulling the line across the opposing flat faces, and then pulling the fishing line so as to pull the knot into engagement with the hole or passage end and to tighten the line around the loops. For quickly and easily dismounting the fish hook from the fishing line, the fishing line is pulled out of the hole or passage and across the opposing fish hook open loops opposing flat faces to an open end.

11 Claims, 7 Drawing Sheets

U.S. PATENT DOCUMENTS

| | | |
|---|---|---|
| 3,855,723 | 12/1974 | McGahee . |
| 3,869,821 | 3/1975 | McGahee . |
| 3,878,637 | 4/1975 | Flower . |
| 3,936,971 | 2/1976 | McGahee . |
| 3,949,511 | 4/1976 | Goldhaft . |
| 4,209,933 | 7/1980 | Manno . |
| 4,294,031 | 10/1981 | Manno . |
| 4,535,562 | 8/1985 | Fry . |
| 4,819,366 | 4/1989 | Manno . |
| 4,905,402 | 3/1990 | Clark . |
| 4,905,403 | 3/1990 | Manno . |
| 5,113,616 | 5/1992 | McManus . |
| 5,165,197 | 11/1992 | Sitton . |
| 5,237,772 | 8/1993 | Gibbs . |
| 5,265,370 | 11/1993 | Wold . |
| 5,279,067 | 1/1994 | Tollison . |

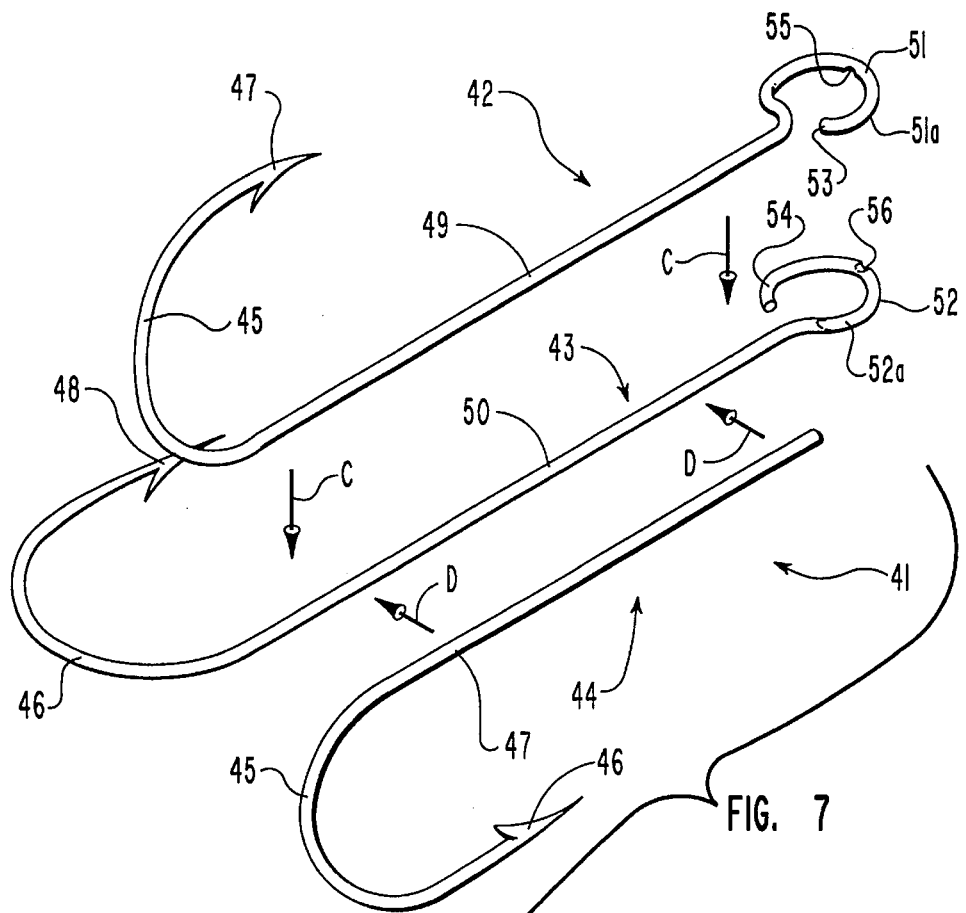
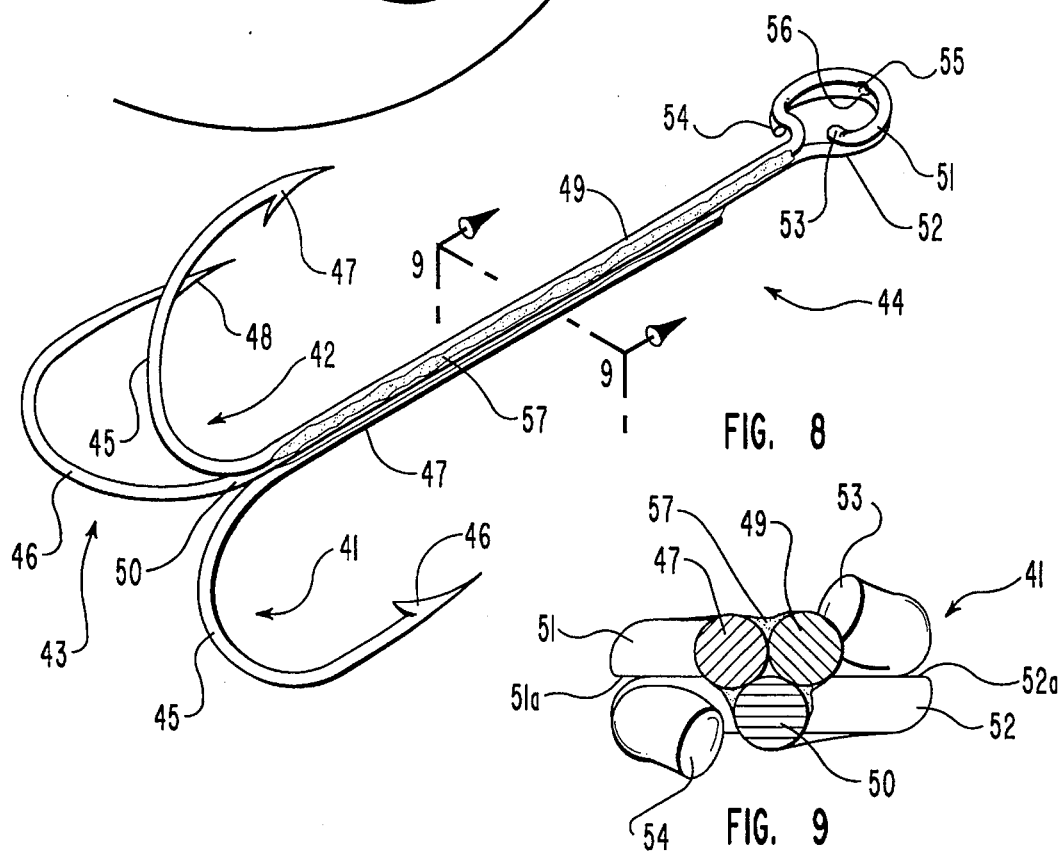
FIG. 7
FIG. 8
FIG. 9

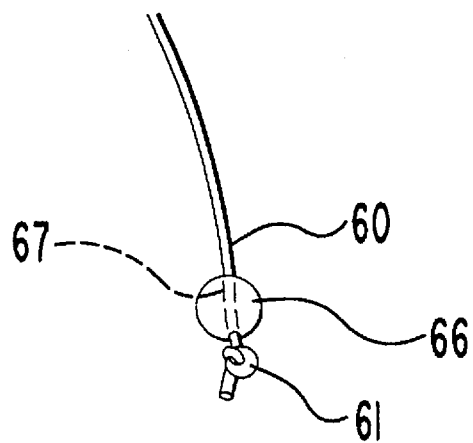
FIG. IIA
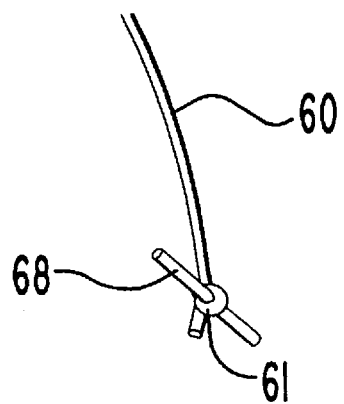
FIG. IIB

FISH HOOK AND METHOD FOR ATTACHMENT TO A LINE OR LURE

BACKGROUND OF THE INVENTION

1. Field of the Invention

This invention relates to fishing devices and in particular to hooks formed to facilitate their attachment onto a fisherman's line or lure.

2. History and Use

Countless types of fish hooks, lures and devices have been developed and marketed for use by fisherman for catching fish. All of which require attachment to a fishing line. The invention, to simplify connection of a barbed or barbless hook to a fishing line, provides an arrangement of juxtapositioned open loops as an end of a hook shank portion for receiving and connecting to an end of a fishing line or lure. The loops each terminate in an open end, with the loop open ends facing in opposite directions. The loops contacting faces are flat and include aligned lateral slots that form a hole or passage across the contacting loop flat surfaces for receiving and positioning a fishing line. The close contact of the open loops flat faces and the hole or passage thereacross provide for connecting, without tying the hook onto a fish line end to connect that line to extend from the hook loops end that forms an eyelet in alignment with the hook shank section. Which connection requires only a passing of an end of the fishing line, that has been knotted, past an eyelet loop end and drawing the knot into engagement with the hole or passage inner surface, or a passing of a fishing line end formed into a loop through one hook eyelet loop end and then the other, or like procedure that can be easily reversed to provide for a convenient and easy dismounting of the hook off from a fishing line end or lure.

3. Prior Art

Hooks, of course, have earlier been constructed to have multiple barb ends projecting from a single shank portion or section that terminates in an eyelet, and some examples of such hook arrangements are shown in U.S. Pat. Nos. 779, 843; 1,334,839; 1,717,190; 2,523,833; 2,590,558; 2,621, 438; 2,700,242 and 3,541,720. Also, even a hook that includes opposing open loops as its eyelet end are shown in U.S. Pat. Nos. 749,852 to Dunn, 788,201 to Friend and 5,265,370 to Wold, and a hook having a spring like eyelet end is shown in U.S. Pat. No. 2,847,220 to Heffron, et al. None of these patents, however, have included opposing loops as the hook eyelet end whose contacting faces are flat and that each have a lateral groove formed therein, the grooves to align and provide a lateral hole or passage across the eyelet. The hole or passage across the loop allows a fisherman to simply and quickly connect and disconnect a fishing line end or lure to the hook by passing the line across a loop open end and positioning the line in the eyelet lateral hole or passage. While earlier procedures and apparatus have provided for releasably coupling a fishing line to a lure, hook or fly, and some examples of such are shown in U.S. Pat. Nos. 3,848,354; 3,869,821; 3,878,637; 3,936,971 and 5,279,067, none teach a line connecting procedure using a hook like that of the invention.

SUMMARY OF THE INVENTION

It is a principal object of the present invention to provide a fish hook device that includes at least a pair of shank portions above a barb or barbless end or ends, that are joined together along their lengths into a single shank section or portion, with top ends of a pair of shank portion each formed into a loop, the pair of loops functioning as the hook eyelet end each, with the loop opposing faces are flat, are juxtapositioned to one another with the loops having open ends that face oppositely and including a lateral hole or passage formed across the opposing loop faces.

Another object of the present invention in a fish hook is to provide, as a unique arrangement for connecting a fishing line or lure thereto, slots or grooves formed across the opposing flat loop surfaces that align to form the hole or passage across the eyelet.

Another object of the present invention in a multi-point fish hook is to provide a hook having curved sections ending in pointed ends or barbs that extend from shank portions that are joined along their lengths, with a pair of which shank portions each including an open loop end, with the loop ends fitting closely together forming the hook eyelet.

Still another object of the present invention is to provide a process for quickly and conveniently mounting the fish hook onto a fishing line end or lure by fitting a knotted end of that line through one of the loop ends and pulling that line through the hole or passage to where the knot end is drawn to extend across the surface of hole or passage end within the eyelet.

Still another object of the present invention in a process for mounting the fish hook onto a fishing line end or lure that has been formed into a loop by pulling a side of that line loop first past one eyelet loop end and then fitting it past the other eyelet loop end and drawing the line through the eyelet transverse hole or passage.

Principal features of the fish hook and process for securing it to an end of a fishing line or lure of the invention include at least a pair of hook members for a single hook, with a first hook member having a curved lower end that terminates in a point, that may include a barb or be barbless that is arranged adjacent to the point. The single hook preferably includes a straight shank with a loop formed as a top end thereof that curves around and is open adjacent to its connection to the top of which shank, and the other or second hook member has a straight shank with an open loop formed at its top end. The first and second hook members are joined along their shanks such that open loop faces, that are both flat, are juxtapositioned to one another with their open ends pointing oppositely. A groove is formed across the opposing flat surfaces of each of the loops that, with the loops juxtapositioned together, align to form a straight hole or passage thereacross. Additionally, for forming a hook with double curved pointed ends, the second member, as described above, also includes the curved pointed end. Further, for forming a hook with treble curved pointed ends that are barbed or barbless, a third hook section that does not include the loop end is provided and is connected along its shank to the shanks of the pair of hook members, forming the treble hook.

In practice, for connecting a hook of the invention onto an end of a fishing line or lure, a knot can be tied in the fishing line, proximate to its end, to have a diameter that is greater than that of the eyelet hole or passage. The line can then be drawn through one loop end and fitted into that hole or passage, with the line then pulled through the hole or passage to where the knot contacts the hole or passage edge within the eyelet juxtapositioned loops. Removal of which fishing line or lure then involves pulling the line from the hole or passage, pulling it between the loop flat faces and past a loop open end. For connecting a lure to the hook, one loop end of the hook is urged through a lure eyelet. The eyelet is pulled along the loop opposing faces to the hole or passage wherein the lure eyelet is fitted.

Alternatively, as a single loop tie, the fishing line end may be formed into a loop and that loop, with the knot end down, is fitted through one of the eyelet open loop ends. Whereafter, the fishing line is fitted in the eyelet hole or passage and pulled therethrough to where the fishing line knot is positioned below the hole or passage. Further, as a compound loop tie, the line is formed into a loop, with the knot end down, and is fitted through one of the eyelet open loop ends. The loop is pulled passed the eyelet hole or passage, to where the line has passed out of the eyelet. Whereafter, the line is drawn back into the eyelet through the opposite eyelet open loop end. The line is then pulled through the eyelet hole or passage to tighten the line around the respective eyelet loops, completing the compound loop tie. To remove which single and compound loop ties, the line is merely fitted back through the loop open ends, freeing the hook from the line end.

Additional objects and features will become apparent from the following detailed description and claims, taken together with the accompanying drawings that show a preferred form of the invention.

THE DRAWINGS

FIG. 1 is a profile perspective side by side view of a first embodiment of a single hook of the invention showing first and second hook members, with a first hook member shown as including a curved lower section that ends in a pointed end, shown as including a barb, and a straight shank that ends in an open loop end that is slotted thereacross, with the second member shown as having a straight shank that ends in an open loop end that is slotted thereacross;

FIG. 7 is a profile perspective view of a third embodiment of a treble hook of the invention that is like the hooks of FIGS. 1 and 4 and includes first, second and third hook members, with the first and second hook members like those shown in FIG. 4, except that one of the loop ends is at a right angle to the other, and with the third hook member shown as lacking an open loop end;

FIG. 8 is view like FIGS. 2 and 5 showing the first, second and third hook members joined along their shanks into the treble hook, with the opposing flat faces of the first and second hook members juxtapositioned to one another, and with their slots aligned forming a hole or passage thereacross;

FIG. 9 is a view like FIG. 6 showing a cross section taken along the line 9—9 of FIG. 8, to show the junctions of the treble hook first, second and third hook members shanks;

FIG. 11A shows an enlarged view of the fishing line at its knotted end as having had a bead fitted to the end thereof;

FIG. 11B shows a view of the fishing line knotted end that is like that of FIG. 11A only showing the knot as having been tied around a pin;

Figure 12:
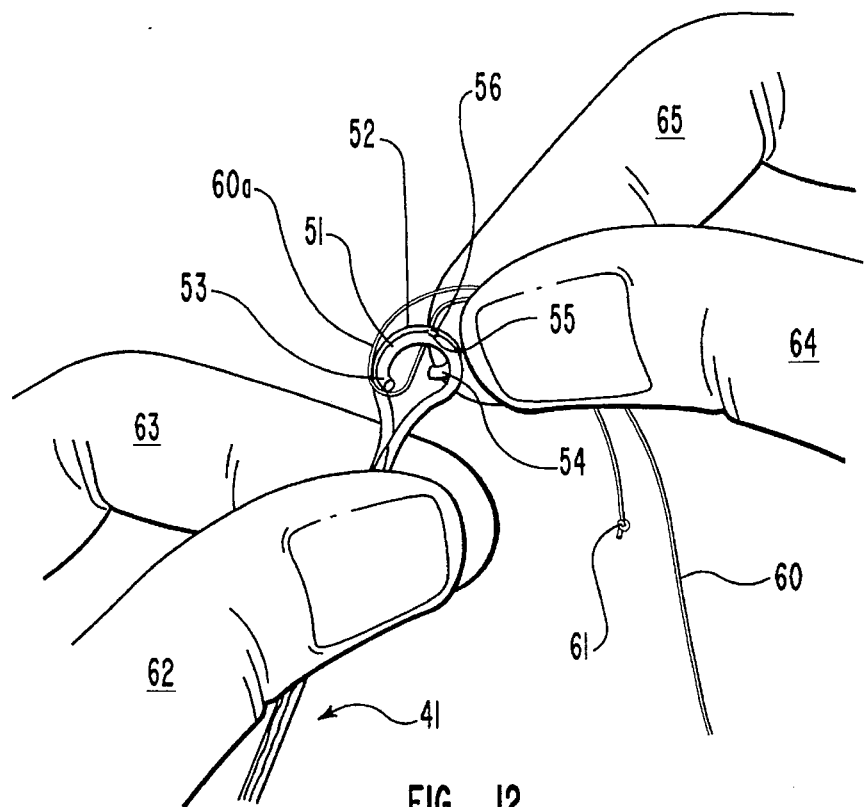
FIG. 12 shows the fishing line loop end knot of FIG. 11 being fitted into the eyelet, and showing the loop formed in the fishing line being fitted under another eyelet open loop end, and with the section of the line wherein the knotted end is formed maintained on the opposite side of the eyelet.
Figure 13:
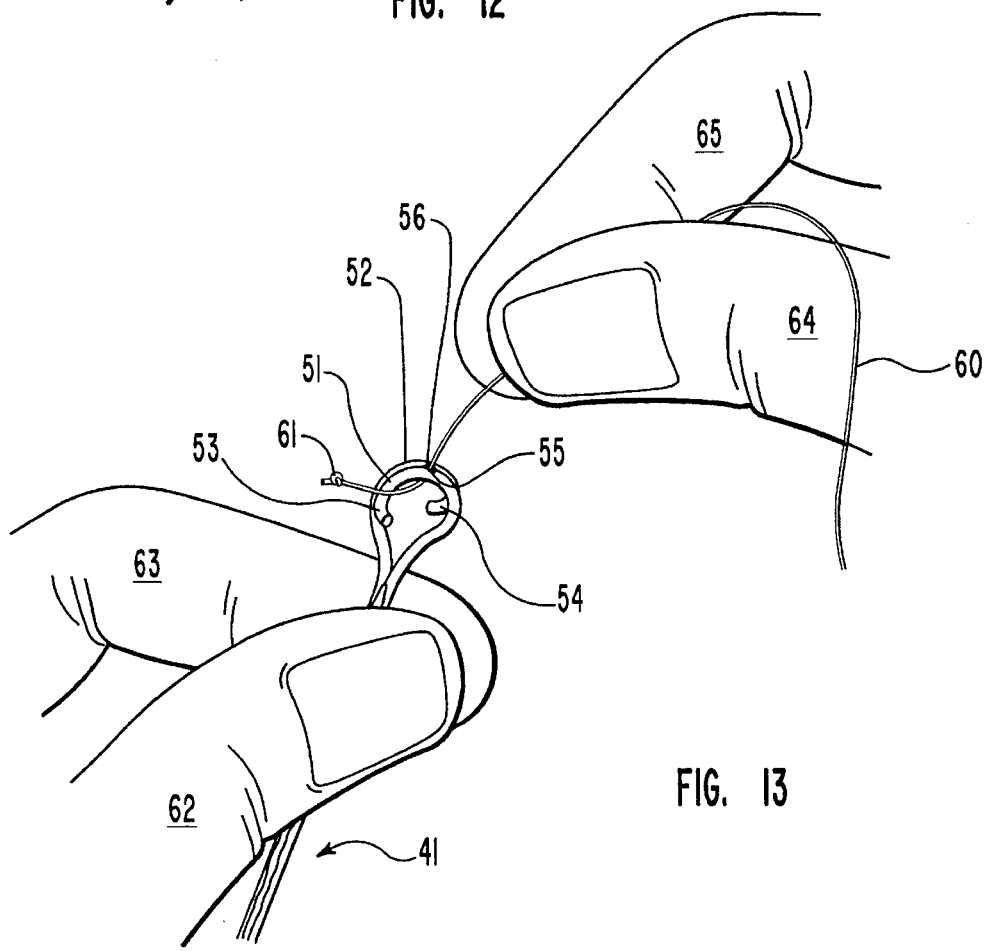
Figure 14:
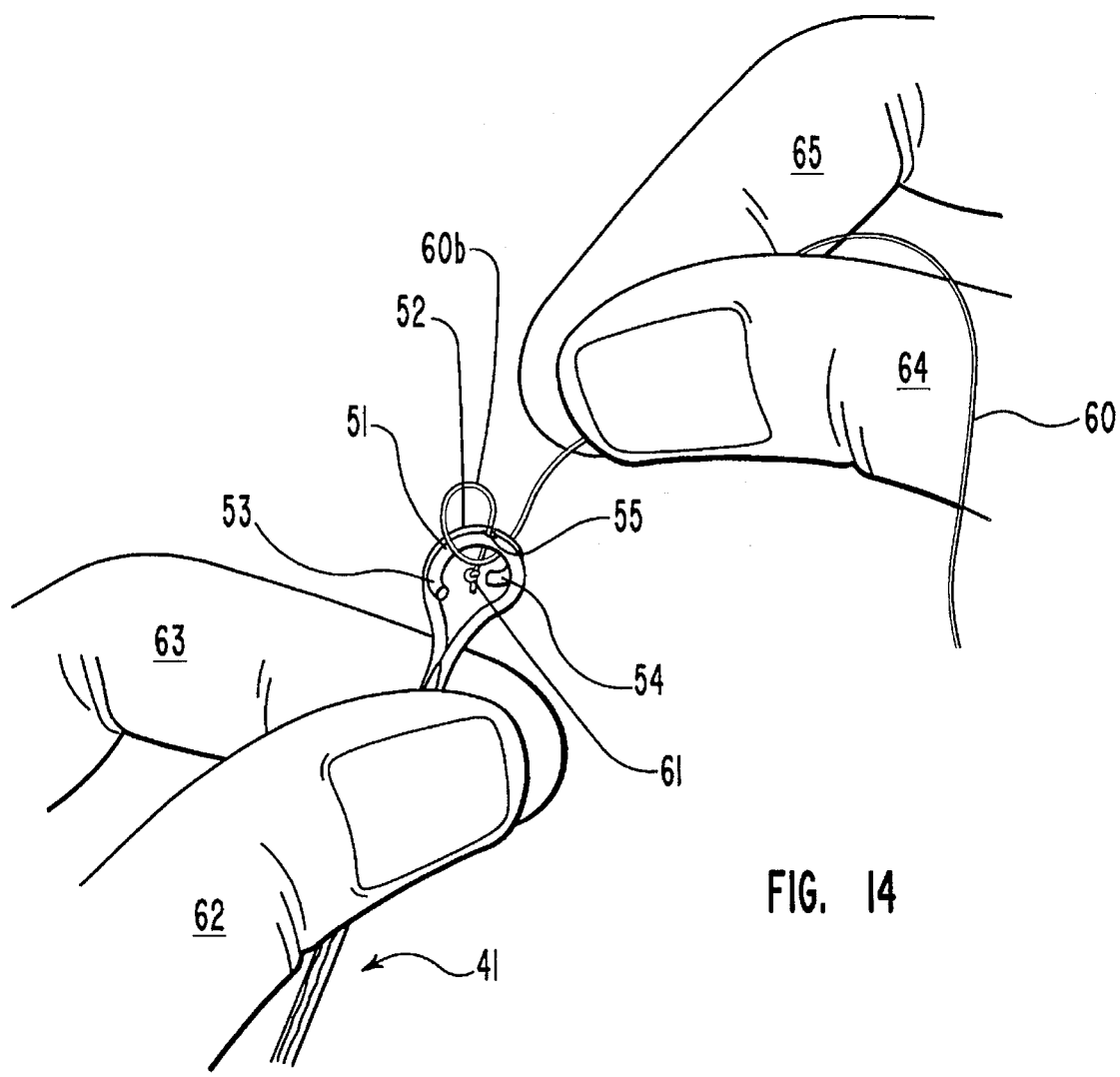

FIG. 13 shows the fishing line loop end knot of FIG. 12 as having passed between the open loops to align with the hole or passage and showing part of the fishing line as having been pulled through the eyelet; and FIG. 14 is a view like that of FIG. 13 only showing the fishing line as having been formed into a second loop with the line pulled through one eyelet open loop end and out the other, whereafter the fishing line is pulled tight causing the second loop to tighten around the eyelet as a compound loop.

DETAILED DESCRIPTION

Figure 1:
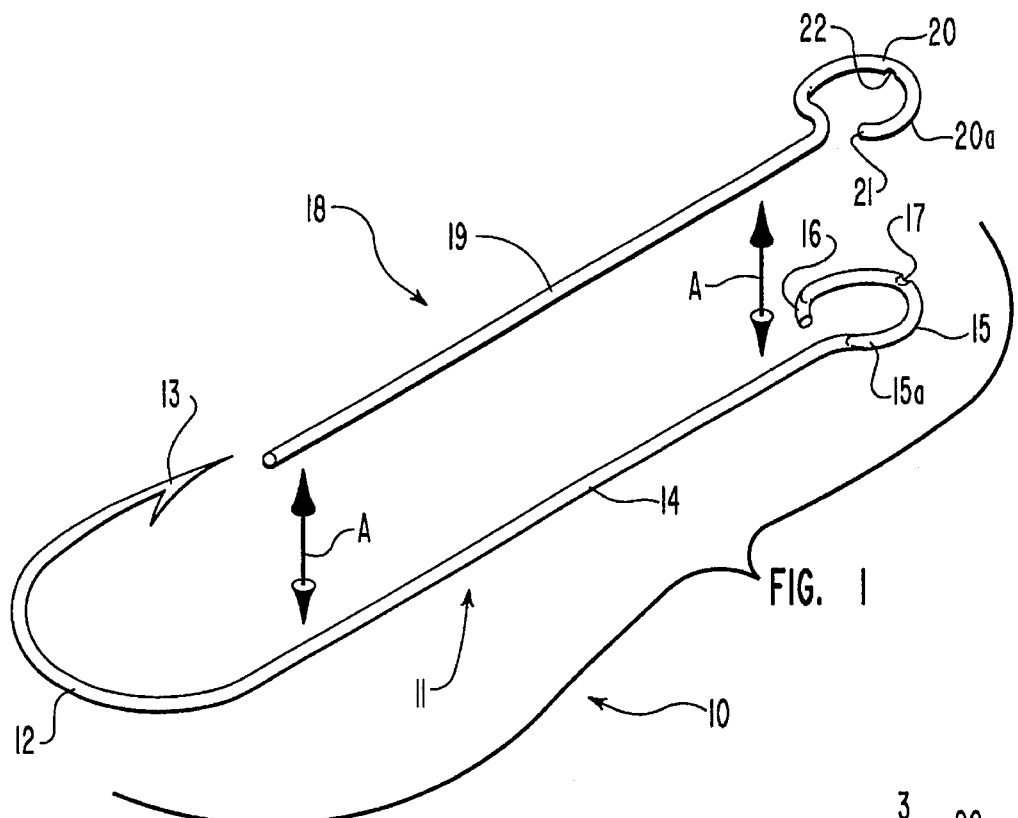
Figure 2:
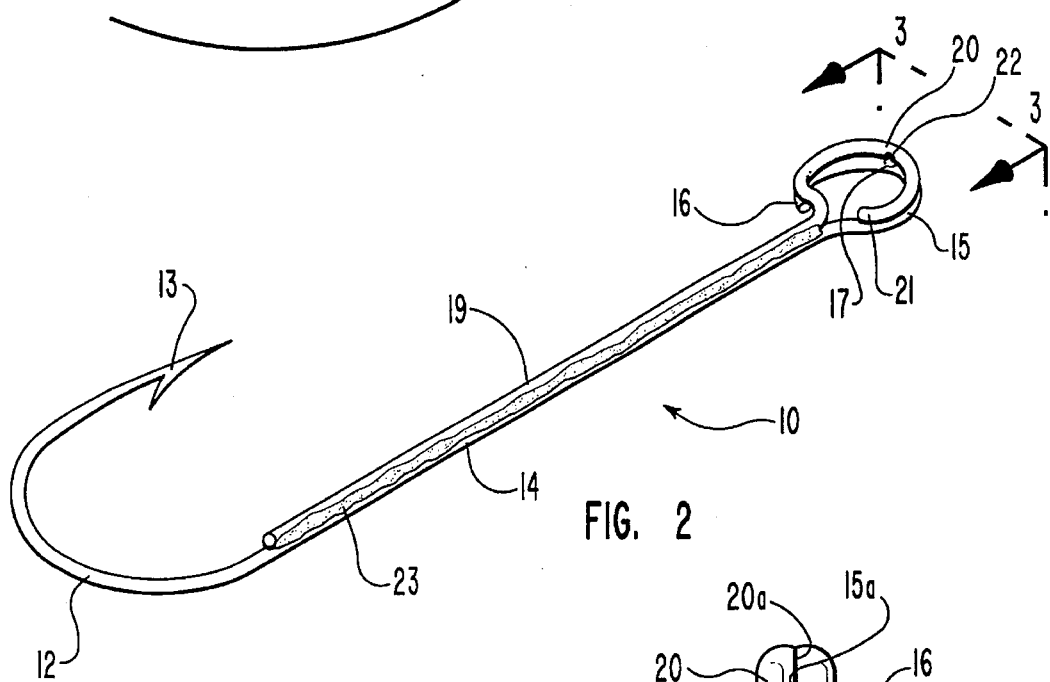
FIG. 2 is a profile perspective view showing the first and second hook members of FIG. 1 joined along their shanks into a single hook with opposing faces of their open loop ends juxtapositioned to one another, and with the individual loop slots aligned to form a hole or passage thereacross.
Figure 3:
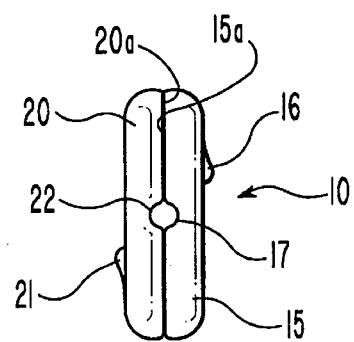
FIG. 3 is an enlarged top plan view of the open loop ends of FIG. 2 taken along the line 3—3 thereof showing the opposing juxtapositioned faces as being flat.

FIGS. 1 through 3 show a first embodiment of the invention in a single hook 10. Shown in FIG. 1, the single hook 10 includes of a hook member 11 that has a curved portion 12 that ends in a barbed pointed end 13 though, it should be understood, a barb need not be included, and the hook can be barbless, within the scope of this invention. The curved portion 12 connects to a bottom end of a straight shank 14 that is bent at a top end into a loop 15 that is open at its end 16. The loop end 16 is preferably bent slightly outwardly from the plane of the loop 15, as shown best in FIG. 3. Shown in FIGS. 1 and 2, the single hook 10 further includes a straight member 18 that includes a straight shank 19 and has a top end that is bent into a loop 20 that is open at end 21. Which end 21, like end 16, is preferably bent slightly outwardly from the plane of the loop, as shown best in FIG. 3. The hook member 11 and straight member 18, are joined along their shanks 14 and 19, illustrated by arrow A in FIG. 1, as by soldering, or the like, shown at 23 in FIG. 2. So arranged, opposing surfaces or faces of loops 15 and 20, that are preferably flat, as shown in FIG. 3, are juxtapositioned so as to closely engage one another. So arranged, grooves 17 and 22 that have been formed, respectively, across loops 15 and 20 align, as shown in FIGS. 2 and 3, to form a hole or passage thereacross.

Figure 4:
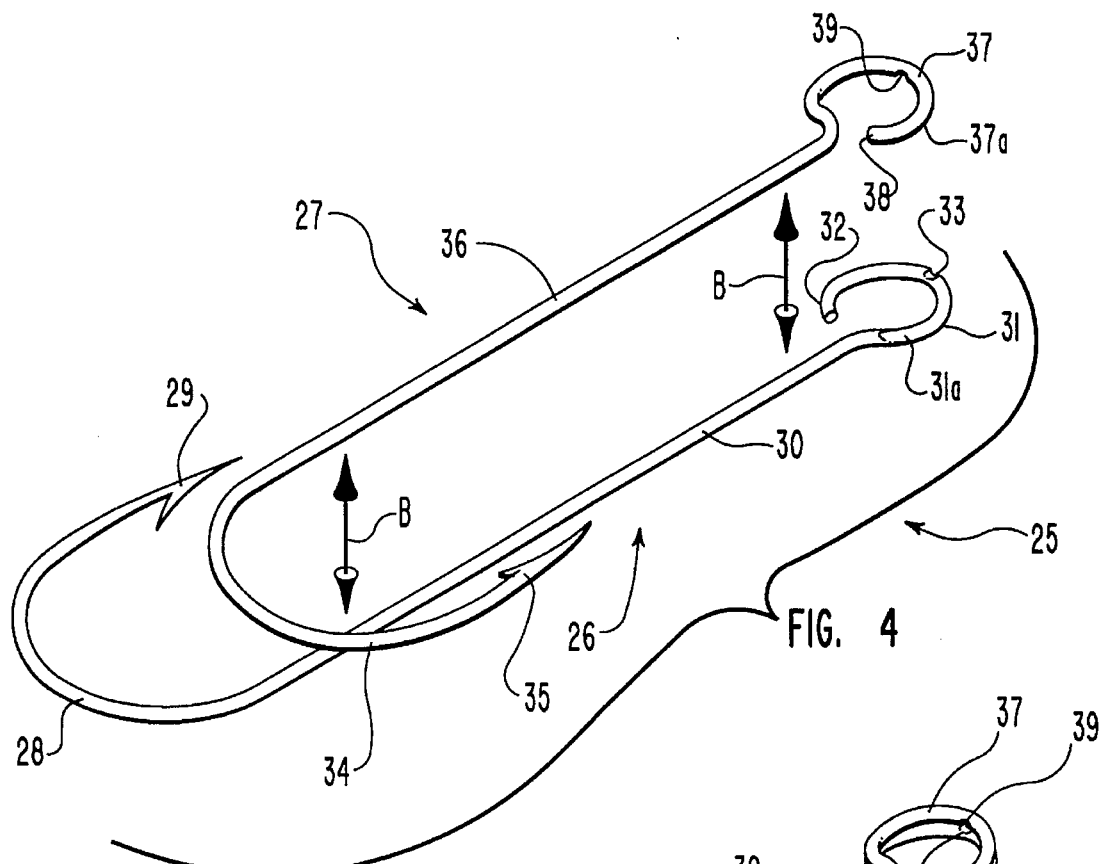
FIG. 4 is a profile perspective view of a second embodiment of a double hook of the invention that is like the single hook of FIG. 1 only showing both the first and second hook members as including curved lower portions with pointed ends and shown as including a pair of barbs.
Figure 5:
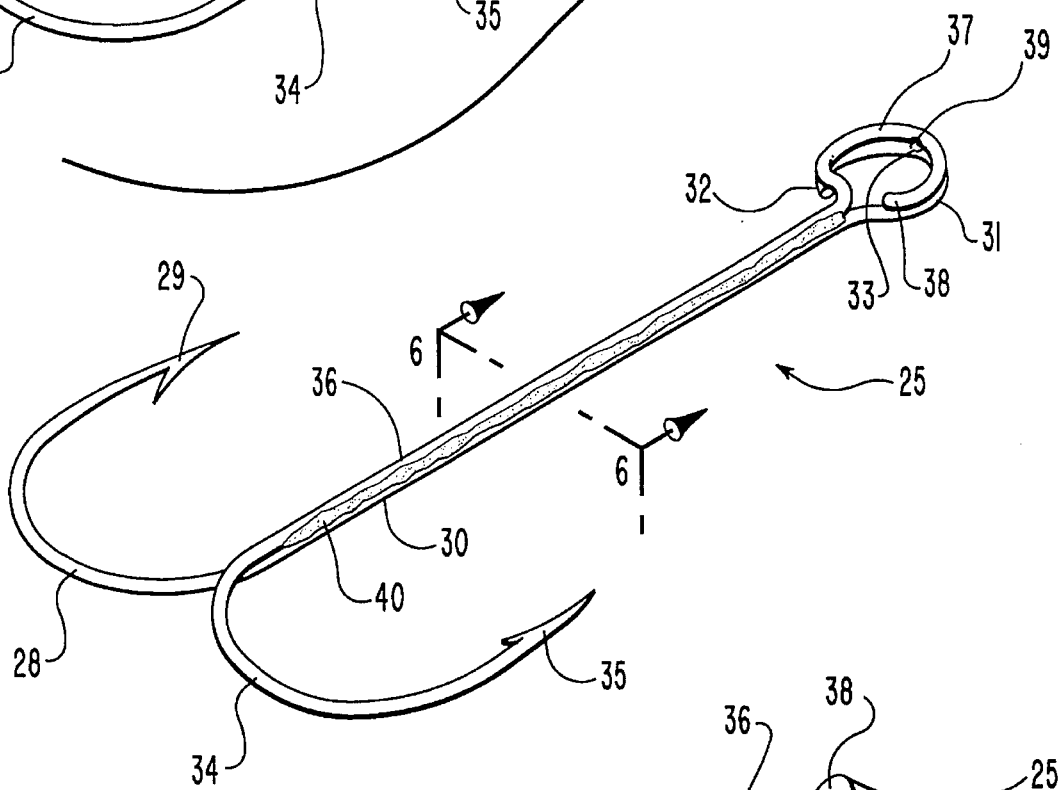
FIG. 5 is a profile perspective view showing the first and second hook members of FIG. 4 joined along their shanks into a double hook with opposing flat faces of their open loop ends juxtapositioned to one another, and their slots aligned forming a hole or passage thereacross.
Figure 6:
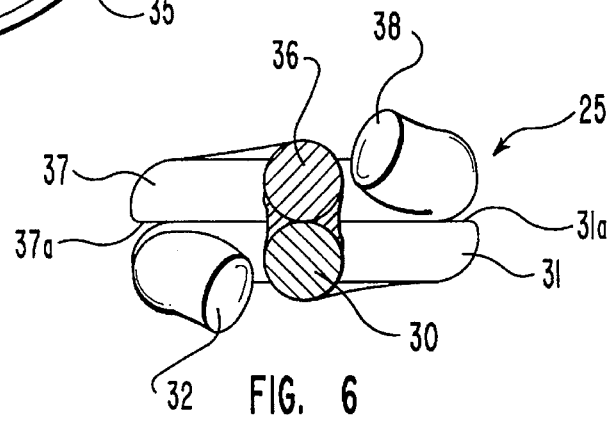
FIG. 6 shows a cross section taken along the line 6—6 of FIG. 5, showing the junction of the double hook first and second hook members shanks.

FIGS. 4 through 6 show a second embodiment of the invention in a double hook 25. Shown in FIG. 4, the double hook 25 includes a pair of hook members, herein identified as first hook member 26 and second hook member 27. The first and second hook members, it should be understood, are essentially identical to one another. The first hook member 26, like hook member 11, includes a curved lower portion 28 that ends in a barbed pointed end 29, though, it should be understood, as with single hook 10, the double hook may be formed without barb ends. The curved portion 28 connects to a bottom end of a straight shank 30 that is bent at a top end into a loop 31 that has a flat face 31a, and is open at end 32. Which end 32 is preferably bent slightly outwardly from the plane of the loop, as shown best in FIG. 6. Shown in FIGS. 4 and 5, the double hook 25 also includes an additional or second hook member 27 that is preferably like the first hook member 26 and includes a curved lower portion 34 that ends in a pointed end 35, that is shown to include a barb therewith, though, of course, no barb is required. The curved portion 34 connects to a bottom end of a straight shank 36 that is bent at a top end into a loop 37 that has a flat face 37a, and is open at end 38. Which end 38 is preferably bent slightly outwardly from the plane of the loop, as shown best in FIG. 6. The shanks 30 and 36 of the first and second hook members 26 and 27, as illustrated by arrows B in FIG. 4, and as shown best in FIG. 5, are secured together, as by soldering, or the like, shown at 40, to form the double hook 25. So arranged grooves 33 and 39, respectively, that have been formed across loops 31 and 37 opposing flat faces 31a and 37a align, as shown in FIGS. 5 and 6, to form a hole or passage thereacross.

FIGS. 7 through 9 show a third embodiment of the invention in a treble hook 41. Shown in FIG. 7, the treble hook 41 includes a pair of first and second hook members 42 and 43 that are essentially like the first and second hook members 26 and 27 of FIGS. 4 through 6, and further includes a straight member 44 that includes a curved bottom portion 45 with a pointed end 46, shown as including a barb therewith, and a straight shank 47. The first and second hook members 42 and 43, respectively, each include a curved bottom portion 45 and 46, respectively, that each include a pointed barb end 47 and 48, respectively, though, of course, the pointed ends can be formed without barbs, within the scope of this disclosure. A straight shank 49 and 50, respectively, is connected to each curved bottom portion 45 and 46 that each include a loop 51 or 52, respectively, that are each open at ends 53 and 54, respectively, and have opposing flat faces 51a and 52a, respectively. Which loop ends 53 and 54, respectively, as shown best in FIG. 9, are preferably bent slightly outwardly from the plane of the loops 51 and 52. Where, as shown in FIGS. 4 through 6, the first and second hook members 26 and 27 are identical, the loops 51 and 52 of the first and second hook members 42 and 43, as shown in FIGS. 6 through 9, are at right angles to one another, with the straight member 44 to connect in the plane of the one hook member and at a right angle to the other hook member. It should, however, be understood that the first and second hook members 42 and 43 could be identical and joined as shown in FIGS. 5 and 6, with the straight member 44 connected at a right angle to the shanks of both of first and second hook members 42 and 43, within the scope of this disclosure. Like the loops of the above described single and double hooks 10 and 25, respectively, the opposing flat faces 51a and 52a of the loops 51 and 52 of the first and second hook members 42 and 43 are in juxtaposition arrangement to where grooves 55 and 56, respectively, that are formed thereacross, align, as shown best in FIG. 8, and form a straight hole or passage across the hook eyelet end. The respective first second hook members 42 and 43 are connected along their shanks 49 and 50, as illustrated by arrows C in FIG. 7, and the straight member 44 shank 47 is also connected to which shanks 49 and 50, as illustrated by arrows D in FIG. 7. The connection is preferably made by soldering shown at 57, or the like, as shown in FIGS. 8 and 9. Treble hook 41 is thereby formed that, like the described single and double hooks, 10 and 25, respectively, includes the pair of juxtapositioned loops having opposing flat faces and open outturned ends for receiving and connecting to an end of a fishing line or lure, as set out and described hereinbelow.

Figure 10:
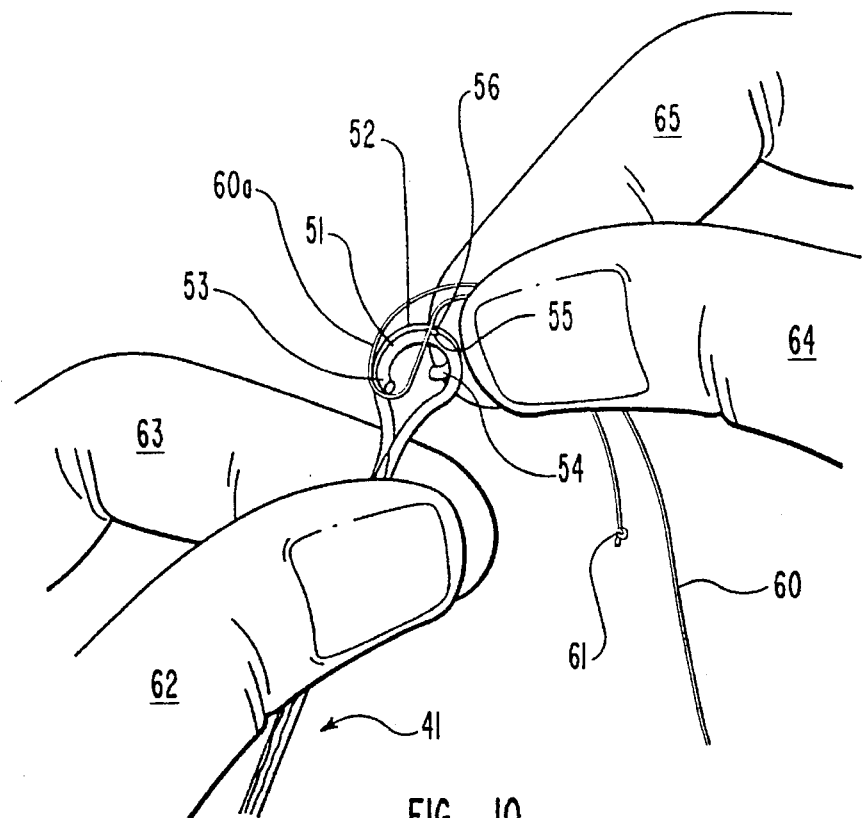
FIG. 10 shows a hook of the invention, that may be either the single, double or treble hook, held by an operator between their thumb and forefinger, and showing the operator's other thumb and forefinger holding a fishing line that has had a knot formed in its end, and showing the line as having been formed into a loop that is aligned for passage under an open loop end.
Figure 11:
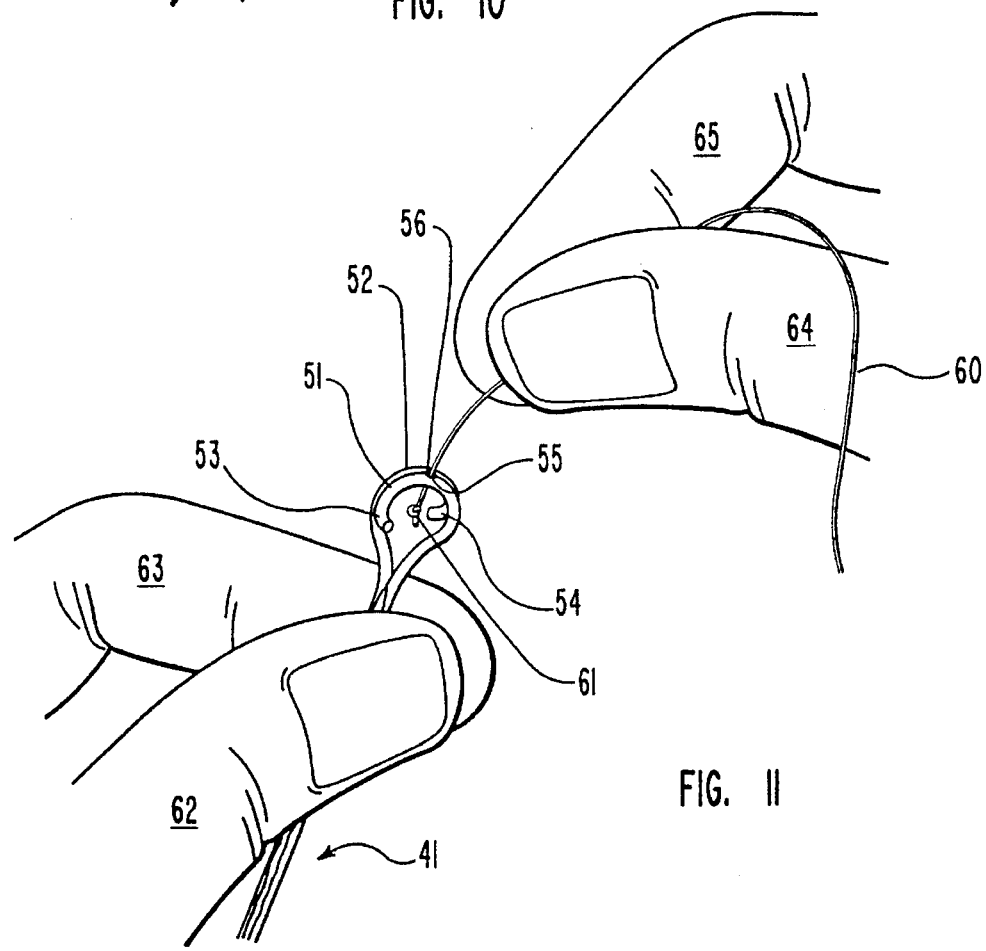
FIG. 11 shows the fishing line of FIG. 10 as having been passed between the open faces of the eyelet open loops and being pulled through the hole or passage forming a single loop tie.

FIGS. 10 and 11 show a single loop tie as a first step in a procedure for connecting the different embodiments of the hook of the invention onto the end of a fishing line 60. For this procedure the treble hook 41 is shown as being used though, it should be understood, this procedure and the steps set out below can be practice on the single and double hooks 10 and 25 also, within the scope of this disclosure. Shown in FIGS. 10 and 11, the treble hook 41 includes the loops 51 and 52 that have opposing flat faces that are juxtapositioned to one another and, respectively, outwardly bent ends 53 and 54, with grooves 55 and 56 formed across the opposing loop faces forming a hole or passage thereacross. So arranged, an operator's left hand holds the treble hook 41 shank between their thumb 62 and index finger 63, with the operator's right hand shown holding a loop 60a that has been formed in the fishing line 60, between the right hand thumb 64 and index finger 65. So arranged, the operator, with their right hand, guides the fishing line loop 60a under the eyelet loop 51 end 53, and passes it between the eyelet loops opposing flat faces, to where the fishing line is installed in the grooves 55 and 56 that form the hole or passage. Thereafter, the fishing line loop 60a is released, and, as shown best in FIG. 11, the operator, holding the fishing line 60 between their thumb 64 and index finder 65, pulls that line through the hole or passage to where a knot 62 that has been tied in the fishing line end engages the inner end edges of the hole or passage. Contact of the knot with the hole or passage edge prohibits further fishing line travel, mounting the treble hook onto the fishing line. To dismount which treble hook 41 off from fishing line 60, an operator merely pulls the fishing line 60 out from the hole or passage and between the opposing flat faces of eyelet loops 51 and 52 to a loop end 53 or 54, thereby releasing the fishing line 60. Similarly, a lure can be mounted to the single, double, or treble hook by fitting the lure eyelet, not shown, through a loop open end and drawing it across the loop faces to pass into the hole or passage, completing the mounting.

To facilitate mounting of the fishing line onto a hook of the invention, within the scope of this disclosure, as shown in FIG. 11A the fishing line 60 end may be connected to a bead 66 as by fitting the line through a passage 67 that, as shown in broken lines, is formed through the bead 66, and with the line tied into a knot on the opposite bend side thereof. Further, as shown in FIG. 11B, the knot 61 may be tied around a pin 68, or the like, for insuring the that the fishing line cannot be pulled back through the hole or passage.

FIGS. 12 through 14 illustrate a compound loop tie as a second procedure for connecting the different embodiments of the hook of the invention onto the end of fishing line 60. FIG. 12 shows a view like FIG. 10, with the fishing line 60 formed into a first loop 60a and pulled from loop 51 end 53 between the loops 51 and 52 to the grooves 55 and 56. With, in FIG. 13, the fishing line 60 shown being pulled along the grooves 55 and 56, forming the single loop tie the fishing line 60 is pulled through the grooves 55 and 56 as shown in FIG. 11. To complete the compound loop tie, and prior to drawing the fish line 60 through the grooves 55 and 56, the line is looped at 60b from the eyelet top to be pulled under loop end 53, traveling between the opposing flat faces of the loops 51 and 52, and out the loop end 54 to the altitude shown in FIG. 14. Thereafter, by pulling the fishing line the loop 60b tightens around the loops 51 and 52 as the knot 61 is pulled into engagement with the bottom ends of grooves 55 and 56, completing the compound loop tie connecting the treble hook 41 onto the fishing 60.

While preferred embodiments of my invention in a fish hook and two embodiments of procedures for quickly and easily mounting and dismounting the fish hook onto to and off of a fishing line have been shown and described herein, it should, however, be understood that the present disclosure is made by way of example only and that variations and changes thereto are possible without departing from the subject matter coming within the scope of the following claims, and a reasonable equivalency thereof, which claims I regard as my invention.

I claim:

1. A fish hook comprising, a pair of hook members each having a straight shank that terminates in a loop as a shank top with each loop open at one end, and at least one of said hook members includes a curved lower portion that terminates in a pointed end, and said hook member loops have flat opposing faces juxtapositioned to one another and with said loop open ends facing oppositely and each flat opposing face includes a slot or groove formed thereacross, said slots or grooves aligning and forming a hole or passage with said loop flat opposing faces are in contact; and means for connecting said fish hook members together at their shanks.

2. A fish hook as recited in claim 1, wherein both said hook members include a curved lower end that terminates in a pointed end.

3. A fish hook as recited in claim 2, further including a third hook member that has a straight shank is curved a lower portion therof and terminates in a pointed end.

4. A fish hook as recited in claim 1, wherein the loop ends are each bent outwardly from the plane of the loop.

5. A fish hook as recited in claim 1, wherein the means for connecting said hook members together consists of soldering said hook members shanks together.

6. A process for mounting a fish hook onto an end of a fishing line where the fish hook includes at least one curved lower end that terminates in a point and a straight shank portion that terminates in a pair of open loops with juxtapositioned flat opposing faces wherein each opposing face includes a slot or groove formed thereacross that align to form a hole or passage and with the loop open ends facing oppositely, said process comprising, forming a knot in an end of a fishing line; fitting said fishing line past one open loop; pulling said fishing line between said open loops opposing faces and into a groove or slot formed across each said open loop flat opposing face; and pulling said fishing line through said open loops grooves or slots to where said fish line knot engages bottom edges of said open loops grooves or slots.

7. A process as recited in claim 6, wherein an operator holds the fish hook shank between their thumb and index finger of one hand; and, with their other hand, holds a loop as has been formed in the fishing line between their thumb and index finger and fits said fishing line loop across an open loop end and passes said fishing line loop between the open loops opposing flat faces and into the grooves or slots formed in the open loops opposing flat faces.

8. A process as recited in claim 7, further including, passing the fishing line over the juxtapositioned open loops and pulling said fishing line through a first open loop open end between the open loop opposing flat faces, across the section of fishing line that is maintained in the open loops grooves or slots, and out of a second open loop open end; and pulling on the fishing line to slide said fish line knot end into engagement with bottom ends of said open loops grooves or slots to tighten said fishing line around said juxtapositioned open loops.

9. A process as recited in claim 6, further including, prior to forming a knot in the fishing line end, fitting said fishing line through a transverse hole that has been formed in a bead.

10. A process as recited in claim 6, further including tying the fishing line knot around a pin.

11. A process as recited in claim 6, further including, for removing the fish hook off of the fishing line, grasping the fishing line knot and pulling it and the fishing line out of the aligned grooves or slots, between the open loops opposing flat faces and out from an open loop end.

\* \* \* \* \*